United States Patent [19]
Diffeyes et al.

[11] Patent Number: 5,101,319
[45] Date of Patent: Mar. 31, 1992

[54] PRE-ENGINEERED ELECTRODE/DIELECTRIC COMPOSITE FILM AND RELATED MANUFACTURING PROCESS FOR MULTILAYER CERAMIC CHIP CAPACITORS

[75] Inventors: Robert J. Diffeyes, Arlington; Jewel G. Rainwater, North Richland Hills, both of Tex.; William R. Belko, Carlsbad, Calif.; Arne B. Carlson, Graham, Tex.

[73] Assignee: Vistatech Corporation, Syracuse, N.Y.

[21] Appl. No.: 504,330

[22] Filed: Apr. 3, 1990

[51] Int. Cl.$^5$ .................... H01G 4/10; H01G 7/00
[52] U.S. Cl. ........................... 361/321; 29/25.42
[58] Field of Search ............ 29/25.42; 361/303, 304, 361/305, 311, 312, 313, 321, 323, 402; 264/26

[56] References Cited

U.S. PATENT DOCUMENTS

| | | | |
|---|---|---|---|
| 3,334,002 | 8/1967 | Heywang | 29/25.42 X |
| 3,520,054 | 7/1970 | Pensack et al. | 29/25.42 X |
| 3,533,148 | 10/1970 | Tolar | 29/25.42 X |
| 4,301,580 | 11/1981 | Wallace | 29/25.42 |
| 4,562,628 | 1/1986 | Marneffe et al. | 29/25.42 |
| 4,586,972 | 5/1986 | Yokotani et al. | 29/25.42 X |
| 4,605,835 | 8/1986 | Deffeyes | 29/25.42 X |

FOREIGN PATENT DOCUMENTS

| | | | |
|---|---|---|---|
| 19606 | 6/1978 | Japan | 29/25.42 |
| 851406 | 10/1960 | United Kingdom | 29/25.42 |
| 1030078 | 5/1966 | United Kingdom | 361/313 |

OTHER PUBLICATIONS

I.B.M. Technical Disclosure Bulletin, vol. 23, No. 7A, Dec. 1980, pp. 2892–2893.

*Primary Examiner*—Donald A. Griffin
*Attorney, Agent, or Firm*—Samuels, Gauthier & Stevens

[57] ABSTRACT

Multilayered ceramic capacitors are manufactured using electrode machine coating densification techniques. The capacitors produced have electrodes and dielectric layers which are more uniform, thinner and flatter than prior art electrode and dielectric layers. An electrode pattern is printed on a release sheet and calendered. A dielectric overcoats the electrode pattern and is calendered, forming an electrode embedded green sheet. The green sheet is stacked with similarly formed electrode embedded green sheets, the stack is laminated and unfinished capacitors are cut from the stack.

42 Claims, 10 Drawing Sheets

PRE-ENGINEERED ELECTRODE/DIELECTRIC COMPOSITE FILM AND RELATED MANUFACTURING PROCESS FOR MULTILAYER CERAMIC CHIP CAPACITORS

BRIEF STATEMENT OF THE INVENTION

This invention relates to multilayered ceramic electronic devices such as capacitors, varistors, thermistors and other multilayered circuits; and to methods for their manufacture. The preferred embodiment of this invention embodies the use of electrode machining and coating densification techniques to produce capacitors having electrodes and dielectric layers which are more uniform, flatter and thinner when compared to the electrodes and dielectric layers of prior art multilayered ceramic capacitors.

BACKGROUND OF THE INVENTION

Multilayered ceramic capacitors and their structures are well known. Several manufacturing steps are currently employed for the production of multilayered ceramic capacitors.

In making a multilayered ceramic capacitor, dielectric ceramic powder is compounded with various ingredients to achieve special electrical properties. This powder is dispersed in solvents and binders to make a slip or slurry. From the slip, a green or unfired dielectric layer is formed usually by doctor blade casting onto a steel belt.

Electrodes are deposited, usually by silk screen printing onto the green sheet. Alternatively, the green sheet may be cast on a release carrier or paper to facilitate green sheet storage and the electrodes subsequently printed on the green sheet. Another green sheet is layered over the printed green sheet and this other green sheet has an electrode pattern printed thereon. A sequence of dielectric-electrode-dielectric layers is continued. The electrode patterns of successive sheets are offset from one another. After the desired number of layers has been reached, the sheets are pressed or laminated and cut into individual capacitors, which are sintered or fired. Then, end terminations are formed on the capacitors to provide a means for physical and electrical connection to the circuit.

In each of the various stages or steps of the process, potential problems exist which can affect the quality of the finished capacitor. The major potential problems exist in the initial steps of the process, particularly achieving a uniform, flat electrode surface, providing a dielectric layer where the average thickness and the minimum thickness approach equality and in the alignment and stacking of the printed sheets.

More specifically, for printing the electrodes, stainless steel screens typically at 325 mesh are used. The ink is normally forced through with a rubber squeegee. The surface that results is not flat and uniform. Holes and asperities in the deposited electrode result in variable dielectric thicknesses between the electrode layers of the finished capacitors. Other prior art printing techniques also do not solve the problems of wavy edges, rough surfaces and non-uniformity throughout the electrical area.

The presence of bumps in the rough electrode surfaces is known to produce undesirable enhancements of the electrical fields between the dielectric layers. In addition, variations in electrode thickness reduce the dielectric thickness at the bumps to produce non-uniformity and perturbations in the electrical fields. The combination of the reduced dielectric thickness and the disturbed fields caused by the bumps leads to electrical insulation weak spots in the capacitor. Prior art electrode coatings normally 150 microinches thick, are non-uniform and can vary 35 to 40% in thickness. When the electrode pattern is printed on the green dielectric sheet, these lumps remain adding to the thickness and non-uniformity. These non-uniformities can result in material stresses in the finished capacitor. Usually the problem is attempted to be solved by pressure lamination to drive the electrode pattern down into the dielectric sheet or vice versa. The pressure exerted on the stack during lamination may add to the stress level.

A typical dielectric is coated at an average thickness of 1200 microinches to form a green sheet. This dielectric thickness may vary by as much as 30% due to lumps or other irregularities. However, holding a green sheet up to the light, one normally sees a variety of thin spots, streaks and other coating non-uniformities. Because of coating irregularities, if a minimum thickness of 800 microinches is desired, the coating may be applied at an average of 1200 microinches to ensure the minimum. Capacitor reliability is a function of this minimum thickness. However, the greater the average coating thickness, the lower the capacitance and the greater the number of layers required to produce the target capacitance. The capacitance of each layer is defined by the following equation:

$$C = KA/T$$

where C is defined as capacitance, K as the dielectric coefficient, A as the area of the dielectric sandwiched between the two electrode layers and T as the thickness of the dielectric layer. Obviously, dielectric thickness irregularities are highly undesirable due to the impact on total capacitance.

Usually several blank sheets of dielectric form a base layer to give mechanical strength and electrical insulation to the finally formed capacitor. The sheets are printed as they are stacked one on top of the other totalling up to 60 or more layers. It is desirable to align the sheets precisely to produce the proper overlap of electrodes. When the alignment is not precise enough, yield losses can occur. Every other electrode pattern is offset defining "inside foil" and "outside foil" layers which can be connected later. Finally, for strength and electrical insulation, several blank sheets of dielectric are added to the top. The stack is then pressed in a hydraulic press to make a solid laminated stack. Defects, such as debris and line spreading (or blooming) are generated during the handling, stacking and laminating operations. These defects usually manifest themselves as electrical shorts, opens, voltage breakdowns or reliability failures. These defects may not be discovered until after the multilayered ceramic substrate is formed, thereby leading to a defective and non-repairable component. It is believed that these defects are due, at least in part, to the fact that the electrodes (conducting metal pattern or circuitry) are not flush with (do not lie in the same plane as) the surface of the dielectric sheet on which it is printed. As these sheets are stacked the degree of surface irregularity increases from layer to layer increasing the probability of unreliability or voltage breakdown failure.

A precision knife or saw cuts the pressed stack into the tiny individual capacitors. Very careful firing is carried out to burn out the organic binders from the ink and ceramic layers. Too rapid heating causes delamination. Temperatures and heating rates are determined experimentally. Usually, over about 24 hours, the capacitors will be fired to as high as 1400° C. (about 2600° F.) causing the ceramic powder to sinter into a solid ceramic. During this firing, the electrode metal particles also fuse together to form continuous metal foil sheets.

After a careful cooling process, the tiny individual capacitors are placed in a holding fixture. The ends of the capacitor are dipped into other electrode materials, such as silver palladium ink, containing special glass particles called frit. The frit is specially formulated to adhere to the ceramic and to form a structure which keeps the silver-palladium termination from being dissolved in later processing steps. After dipping, a second heat treating step is needed to fire or fuse the end termination ink. When properly done, the fired end termination ink melts and sticks to the exposed electrode foil layers in the body of the capacitor. If not fired hot enough, the end termination will fail to make electrical contact with some of the body electrodes. Heated too rapidly, the capacitor may crack open. At this point, the capacitor is electronically complete and the capacitors are sorted by capacitor value and undergo a wide variety of tests.

The parts are labelled with capacitance value and tolerance. At this stage, they may be used in surface mount technology. Other applications may require that wire leads be attached to the multilayered ceramic capacitor. This use may require the capacitor be dipped in a protective plastic to prevent moisture or corrosion from damaging the part in use.

The process, as currently practiced, suffers from a variety of problems. Irreparable damage to the product can occur at each step. Most importantly, only after firing the final end termination can the part be measured. The problems of each step are hard to track because measurement cannot be made until so late in the process. Defects are thus usually not discovered until after the multilayered ceramic capacitor is formed. The most severe problem of a typical manufacturing process is that between about 25 to 30% of the capacitors do not work at all due to delaminations, electrical shorts or having the wrong capacitance value.

In spite of the multitude of attempts to produce uniform thin electrode coatings and uniform thin dielectric coatings, the prior art problems of bumps, unevenness, line spreading etc. are still prevalent.

PRIOR ART

Baeverle, U.S. Pat. No. 4,814,289, discloses electrodes produced by metal deposition alternating with photo-deposition of a dielectric material.

Desai et al, U.S. Pat. No. 4,799,983, discloses a process for forming a multilayer ceramic substrate. The process comprises the steps of obtaining a plurality of ceramic sheets in the green state, depositing a conductive metal pattern on at least one of the green ceramic sheets, heating the green ceramic sheet so as to soften it, pressing the conductive metal pattern into the at least one green ceramic sheet, stacking and laminating the green ceramic sheets so as to form a substrate and then sintering the substrate.

Marcus, U.S. Pat. No. 4,632,856, discloses passing alternating polymer sheets and electrode layers through a roller mill.

Senda et al, U.S. Pat. No. 4,604,672, discloses the formation of dielectric layers and electrode layers by vacuum thin film forming methods such as sputtering, vacuum evaporation, ion plating and chemical vapor deposition.

Wakino, U.S. Pat. No. 4,424,615, discloses joining composite printed sheets by passing the same through rollers.

Yokouchi et al, U.S. Pat. No. 4,346,516, discloses forcing metal balls into a green ceramic sheet. The metal balls serve the function of end terminations in that they connect the conductive wiring patterns of upper and lower layers.

Wallace, U.S. Pat. No. 4,301,580, discloses embedded electrodes formed by first casting electrodes on a release sheet, stacking and then overcasting dielectric material.

Elderbaum, U.S. Pat. No. 4,008,514, discloses forming an electrode pattern on a release film, casting a green sheet over the electrode, printing a second electrode pattern on the green sheet, casting a second green sheet over the second electrode pattern and applying pressure, and then removing from the release film.

Elderbaum, U.S. Pat. No. 3,882,059, discloses a process for producing capacitors comprising the steps of placing a conductive metal pattern on a release surface, placing a ceramic sheet on the pattern and release surface and then peeling away the ceramic sheet and pattern from the release surface.

Parfet, U.S. Pat. No. 3,800,020, discloses a process wherein powdered metal, on a heated sheet of thermoplastic resin, is forced into the sheet with a die having the embossed circuit pattern on the surface. The remaining powdered metal not forced into the sheet is removed.

Rodriguez, U.S. Pat. No. 3,456,313, discloses the use of offset printing for electrodes.

Noack, U.S. Pat. No. 3,246,573, discloses casting a ceramic slurry around the electrodes.

R. Acosta et al in "Planarization of Copper Circuits for Multilevel Ceramic Package", IBM Technical Disclosure Bulletin, Vol. 26, No. 10B, 5378 (March 1984) discloses embedding of copper conductors in a polymeric matrix by heating the polymer and then pressing the copper conductors into the polymeric matrix. Thereafter, an additional polymeric layer may be applied.

Desai et al in "Screen Printing on Indented Ceramic Green Sheets", IBM Technical Disclosure Bulletin, Vol. 16, No. 11, 3561 (April 1974), discloses hot stamping an indentation into a ceramic green sheet which has been previously coated with polyvinyl alcohol. Thereafter, a paste is squeegeed onto the ceramic sheet to fill the indentation.

Desai et al in "Adhesion Promotion to Green Ceramic Sheets", IBM Technical Disclosure Bulletin, Vol. 16, No. 11, 3563 (April 1974), discloses the coating of a ceramic sheet with an organic resin.

Notwithstanding the work of those skilled in the art, as illustrated by the above references, there does not yet appear a solution to the problem of defects in multilayered ceramic capacitor substrates.

OBJECTS OF THE INVENTION

It is an object of this invention to reduce the minimum dielectric thickness between electrodes necessary to prevent electrical failure of the capacitor wherein the density and structure of the dielectric and embedded electrode produce a much higher capacitance per unit volume than standard commercial capacitor substrates or other similar components.

It is an object of this invention to produce uniform flat electrodes embedded in a dielectric sheet, the surfaces of the electrode being substantially free of bumps and the like.

It is another object of this invention to produce uniform thin dielectric layers wherein their minimum thicknesses approximate their average thicknesses.

It is still another object of this invention to produce an electrode embedded green sheet wherein the exposed surfaces of the embedded electrodes are substantially co-planar with the surfaces of the dielectric.

It is still another object of this invention to use high speed printing, calendering and coating techniques to produce the electrode embedded dielectric sheets of the invention.

It is still another object of this invention to form the sheets on release film and use the release film as a carrier film for registration and stacking of the sheets.

It is still another object of this invention to use the release film as a protective package to store the coated dielectric and embedded electrode material until used. Storage in roll form is a convenient and volumetric efficient method which reduces distortion during storage, reduces oxidation or contamination of the embedded electrode and prevents adjacent layers of dielectric from sticking to one another.

It is still another object of the invention to form multilayered ceramic capacitors using the techniques hereinafter described.

SUMMARY OF THE INVENTION

The invention broadly comprises a method for making passive multilayered electrical components and the components produced by the method. Such components include capacitors, varistors, resistors and inductors, including transformers, and are all characterized by the necessity of having uniform, thin, flat electrode and insulating layers.

In the present invention, techniques are used which result in superior uniformity and flatness of printed electrodes and thinner and flatter dielectric layers to significantly enhance the quality of the component so produced. A preferred embodiment of the invention embodies a method(s) of making multilayered ceramic capacitors.

In one aspect of the invention, an electrode pattern is printed on a release film by planar screen, rotary screen, gravure roll, offset printing, transfer printing, hot stamping, ink jet printing or any other suitable techniques. This printing is followed by a calendering step which flattens the electrode creating smooth (flat) electrode surfaces eliminating the bumps or roughness generally inherent in the printing step.

In another aspect of the invention, the dielectric layer is coated over the calendered electrodes and the dielectric flows freely, without stress, and fills the void spaces around the electrodes thus making a continuous homogeneous sheet. This sheet is then calendered to densify and smooth (flatten) the dielectric layer. These coating and calendering steps ensure that the electrodes are fully embedded and that the electrode surface o the film and the dielectric surface on the film are co-planar. This avoids the resulting hummicks, high stress points and voids that result from conventional manufacturing processes which use pressure to force the electrode layer and the dielectric together. This is important for the subsequent stacking operation to produce a smooth parallel stack. Preferably, the overcoat is applied by a knife over roll technique using methods currently used in the magnetic tape coating industry.

In a preferred embodiment of the invention, a first dielectric layer is coated over the calendered electrode pattern and then calendered. Then a second dielectric layer is coated over the first dielectric layer and the sheet is calendered again.

At this point, the thus produced electrode dielectric sheet is characterized and evaluated for electrical and physical characteristics. By producing the pre-engineered sheet on a plastic film or web, extremely thin dielectric layers are produced relying upon the plastic web to provide the dimensional stability. The dielectric thinness is important because capacitance is inversely proportional to the thickness of the capacitor. Due to the precise control of the coating of the dielectric and the calendering, the minimum dielectric thickness approximates the average dielectric thickness. Prior art dielectric layers are 'rough'. Usually to ensure the design minimum thickness, a dielectric coating of an average thickness of more than 30 to 40% of the minimum is necessary. By contrast, in the present invention, the average thickness is generally only 5 to 15% more than the minimum.

In a conventional process, as the sheets are stacked layer upon layer, because they are uneven, the thickness at the center of the stack is greater than at the edges. Pressing and firing causes severe stresses because of the differing dimensions. Problems with electrode printing also increase because of this uneven surface so that the practical limit for printing is limited to about 50 layers. These stresses cause delamination and cracking of the capacitor with resultant yield losses. The more layers that are stacked together, the worse the problem becomes. In the process of this invention, the electrodes are truly embedded in the dielectric resulting in a thin flat composite sheet.

In still another aspect of this invention, a single layer of dielectric is applied in one coating operation that serves to both embed the printed electrode layer and produce the dielectric layer separating the parallel electrode layers.

During firing of ceramic dielectric and metal electrode green bodies, gas generated by vaporization of organics contained in the formulations must be removed from the capacitor body. Often gas is trapped below the impervious electrode resulting in loss of specification capacitance, delamination of the layers, stress cracks in the dielectric and distortion of the electrode layer.

In still another aspect of the invention, the electrodes are formed with holes therein to allow the gases a more direct route to escape from the green body during firing and help to prevent the formation of trapped gas in pockets under the impervious electrodes. A gravure roll is used which has a pattern formed therein such that the electrodes are printed with the holes.

In still another aspect of this invention, to ensure that the dielectric lies fully between the electrodes, the dielectric is printed between the electrodes by gravure roll.

DESCRIPTION OF THE PREFERRED EMBODIMENT(S)

Figure 1:
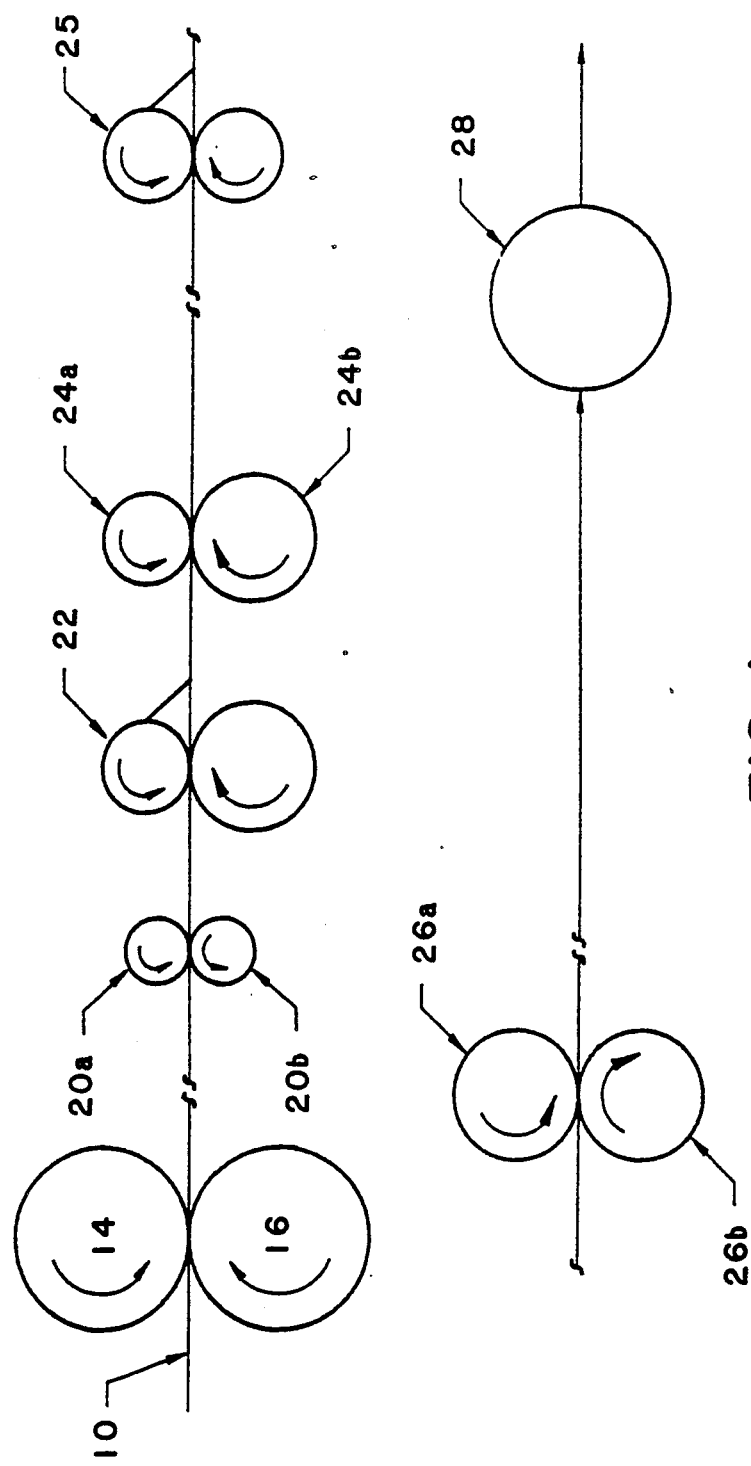
FIG. 1 is a schematic of a system used for manufacture of the disclosed electrode embedded dielectric sheets.
Figure 2:
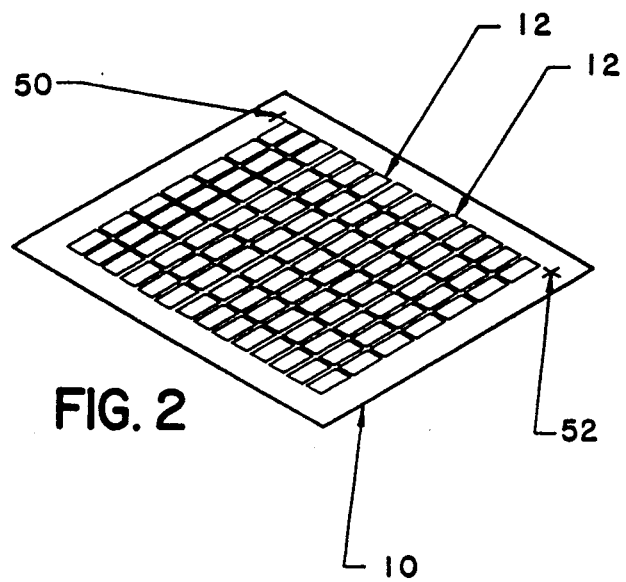
FIG. 2 is an illustration of an electrode pattern printed on a release sheet.

Referring to FIGS. 1 and 2, a release film 10 has printed thereon a pattern of electrodes 12 by a rotary screen printer 11. Alternatively, a gravure roll, offset printer, etcetera can be used. Also printed on the film are two sets of registration marks 50 and 52. The release film 10 is a balanced or tensilized oriented carrier film, typically polyester or polypropylene film of about 2 mils thickness. Thicker or thinner film may be used so long as film tension during the coating operating does not stretch or distort the film excessively. The flatness of the film and surface smoothness (highly planar) are important in that this affects the dimensions of the coated layers. The ink printed on the release film comprises a metallic ink, say for example, a 70/30 weight ratio silver/palladium submicron metal commercial electrode ink formulation and may be printed in any thickness of from 50 to 400 microinches, say for example, 60–80 microinches.

Figure 3A:
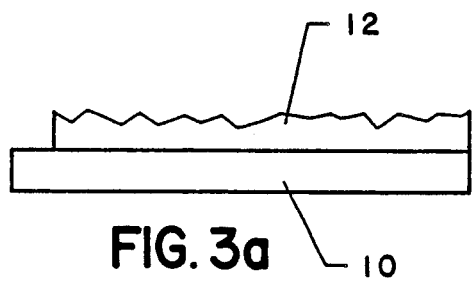
FIGS. 3a and 3b are illustrations of a printed electrode before and after calendering.
Figure 3B:
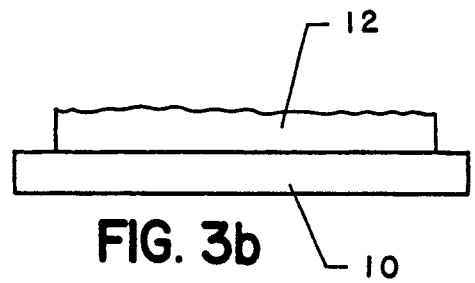

The printed electrode film 10 then passes through calender rolls 20a and 20b, typically at 600 psi nip pressure and at room temperature. A variety of calendering temperatures ranging from 0° C. to 200° C. and calendering pressures ranging from 10 psi to 4,000 psi may be used to impart specific enhancements to the resulting dielectric and embedded electrode layer. This step densifies and enhances the uniformity and flatness of the electrodes. The electrodes are reduced in thickness approximately 10 to 15%. Uniform electrodes should be opaque and the degree of uniformity is determined visually with a microscope using acute angle side illumination. In this step, the bumps or roughness inherently found in printed electrode inks are substantially eliminated and the thickness of the electrode does not vary more than 5 to 10% from an average thickness resulting in a superior 'flat' electrode. An electrode 12 before and after calendering is shown in FIGS. 3a and 3b respectively.

Figure 4A:
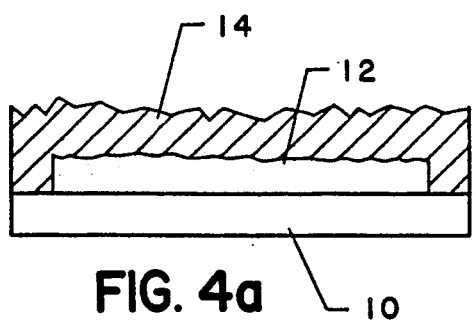
FIGS. 4a and 4b are illustrations of an electrode overcoated with dielectric before and after calendering.
Figure 4B:
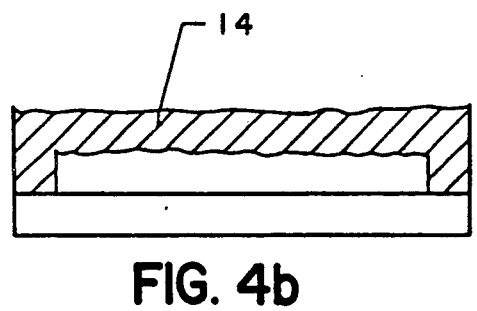

After the electrode pattern has been calendered, the film 10 then passes through a knife over roll applicator shown generally at 22 in FIG. 1 where a dielectric layer 14 is applied, FIG. 4a. The dielectric, such as a standard commercial X7R, NPO or Z5U type capacitor dielectric formulation, may be from 150 to 1500 microinches depending upon the type of capacitor ultimately desired. The dielectric fills completely the regions between the cast electrodes to ensure that the electrodes are fully embedded within the dielectric overcoat. The overcoated film 10 then passes through calender rolls 24a and 24b at a nip pressure of 600 psi and at room temperature to form a densified flat dielectric layer shown in FIG. 4b. This dielectric layer is reduced in thickness 5 to 10%.

Figure 5A:
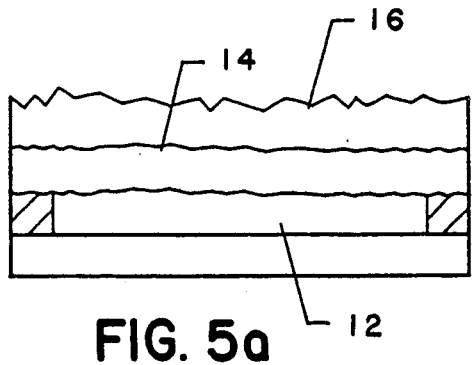
FIGS. 5a and 5b are illustrations of a second dielectric overcoat before and after calendering.
Figure 5B:
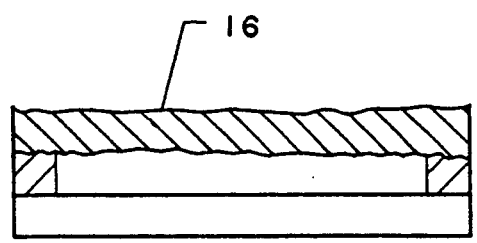

The film 10 then passes through a second knife over roll applicator shown generally at 25 where a second dielectric overcoat 16 is applied in a range of between 150 to 1500 microinches depending on the desired final dielectric thickness, FIG. 5a. The film 10 then passes through calender rolls 26a and 26b at a nip pressure of 600 psi and at room temperature to form the final electrode embedded dielectric sheets 60 on the film 10. This dielectric layer is reduced in thickness 5 to 25%, FIG. 5b. The sheets 60 on the film 10 are stored on a roller 28.

A factor in capacitor design is the design thickness of the fired dielectric layers between electrodes. If the design thickness is 800 microinches then with the best prior art techniques a coating having an average thickness of 900 microinches may have to be cast because of surface roughness or non-uniform thickness, i.e. a coating variation of 800 to 1000 microinches would be expected. Ideally the design thickness and the average thickness should be the same. In practice this has not been achievable. In the dielectric coating and calendering steps of this invention, the design and average thickness tend to approximate one another. For example, if the design thickness is 800 microinches, the average thickness of the dielectric coating applied according to the teachings of this invention may be about 850 microinches. Concomitantly, the ragged irregularities found in prior art dielectric coatings are substantially reduced.

An important factor in capacitor design is the minimum thickness of the dielectric layer between the electrodes. If the layer has thin points, then this can contribute to electrical failure during operation. For the reasons outlined above, it is necessary for the design coating thickness to be set at a point greater than the least thickness that might result in electrical failure. Conventional manufacturing has established 700 to 1000 microinches as the required design thickness for a 50 volt rating resulting in a set point thickness of 850 to 1150 microinches to insure that the minimum thickness would meet the requirements for a 50 volt rating. In the dielectric overcoating and calendering steps of this invention, the required minimum thickness of dielectric can be reduced from 700 to 300 microinches for man capacitor applications. The invention produces a very dense and almost void-free dielectric layer as well as a stronger and more integrated body structure due to the encasement of the electrode layer within the dielectric layer rather than between the individual dielectric layers. Thus, in this invention, not only is thickness reduced to the least required thickness due to improved thickness and surface uniformity control, but also the required minimum thickness to prevent electrical failure is also reduced. Further, the thickness of the dielectric does not vary more than 5 to 15% from an average thickness.

Figure 6A:
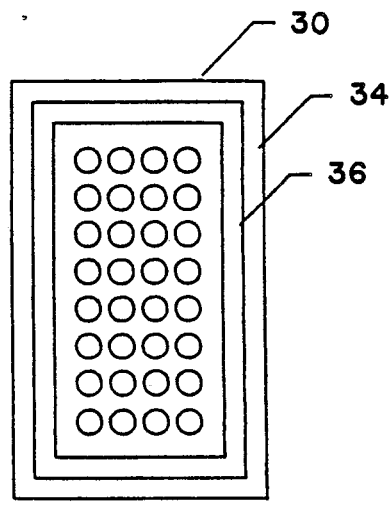
FIGS. 6a and 6b are schematics of gravure patterns.
Figure 6B:
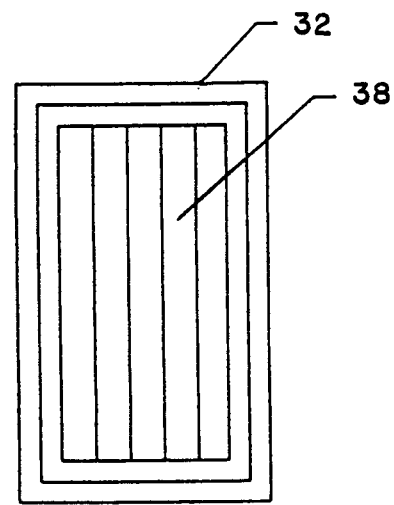

In an alternative embodiment of the invention, a gravure roll may be used in lieu of the rotary screen printer. When a gravure roll is used with a standard quadrahelix pattern of 100 to 150 cells per inch, for an ink deposit thickness, as described herein, the edges of the electrodes are not as smooth and well defined as desired. Referring to FIGS. 6a and 6b, to ensure sharp edges, two gravure patterns are shown 30 and 32. The grooves are photoengraved on the cylinder. As shown in FIG. 6a, the grooves 34 and 36 define a perimeter about a standard gravure pattern. FIG. 6b illustrates a photoengraved electrode pattern comprised solely of grooves 38. The specific dimensioning of these grooves of FIGS. 6a and 6b varies depending on the desired electrode thickness. Typically the depth of the grooves is 20 to 40 microns and the width is 30 to 60 microns. For FIG. 6a, a cell pattern varying from 60 cells per inch to 300 cells per inch may be used. The cell geometry can be a typical polygon, circle, oval or a non-symmetric shape with the cell depth selected to deposit the desired electrode layer thickness. Typically, the depth varies from 20 to 80 microns.

Figure 7A:
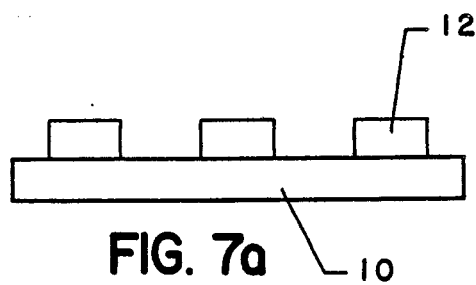
FIGS. 7a and 7b are illustrations of an alternative technique of forming embedded electrodes.
Figure 7B:
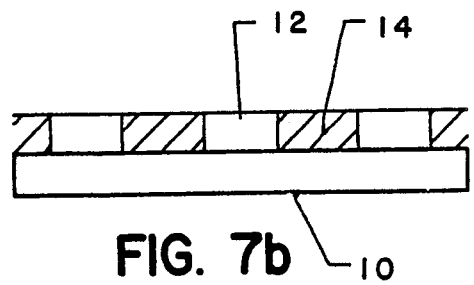

In a further alternative embodiment of the invention, using a gravure roll, referring to FIG. 7a, an electrode pattern 12 is first printed on the film 10 and then the dielectric 14 is cast between the electrode pattern as shown in FIG. 7b. In this embodiment, in lieu of the knife over roll applicator 22 or upstream thereof, a gravure roll is used which has engraved on its surface a pattern which is in register with the printed electrodes such that the dielectric is printed or cast between the electrodes.

Figure 8:
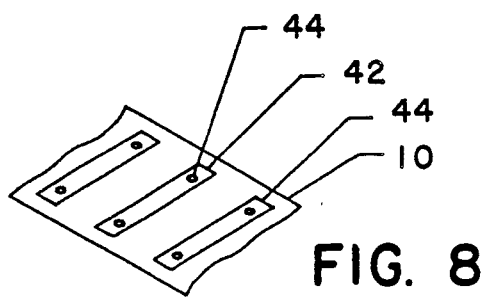
FIGS. 8 and 9 are top and side views of electrodes printed having holes formed therein.
Figure 9:
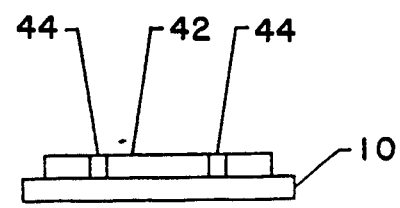
Figure 10:
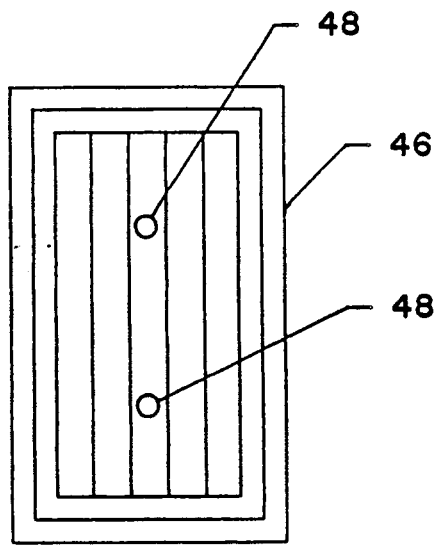
FIG. 10 is a plan view of a gravure pattern for printing the electrodes of FIGS. 8 and 9.

In still another embodiment of the invention, as shown in FIGS. 8, 9 and 10, electrodes 42 may be printed on the release film 10 such that they are characterized by holes 44. A gravure pattern 46 for this embodiment is shown in FIG. 10 wherein the pattern 46 includes non-engraved portions 48 which define the holes of the printed electrodes 44.

The preferred embodiment has been described with the printing of electrode patterns followed by calendering, overcoating a first dielectric layer, calendering, overcoating a second dielectric layer and calendering to form a sheet of superior uniformity, thinness and flatness. If desired, only one overcoating of the dielectric may be used or more than two. Similarly, the calendering may only be of the electrodes, or only of the dielectric or any combination thereof.

To form a capacitor, sheets 60 are cut from the roll 28. Prior to stacking, samples from the coated material are characterized for physical and electrical properties specifically for capacitance per unit volume by processing two or more layers into finished, fired and terminated chips and then measuring capacitance using conventional equipment. Other parameters such as dissipation faster (DF), insulation resistance (IR), and breakdown voltage may also be measured as part of the material characterization step.

Several layers of electrodeless dielectric are used to form a base upon which individual sheets 60 are sequentially placed face side down. After each sheet is placed on the stack, a silicon rubber pad is placed on top of the stack. With a pressure of 100-500 psig, the sheet is adhered to the stack. Alternatively, solvent can be used rather than pressure to adhere the layers of the stack.

The pad is removed and the polypropylene film is released by peeling it off the sheet. These steps are repeated using the registration marks 50 and 52 to precisely align the electrodes in offset alternating relationship until the desired number of sheets are stacked. After the desired number of sheets have been stacked, several electrodeless dielectric layers are added to form a cap. The sheets are then laminated.

Individual unfinished capacitors are cut from the stack. Such an unfinished capacitor 60 comprises electrodes 62, dielectric layers 64 and dielectric caps 66.

Figure 13:
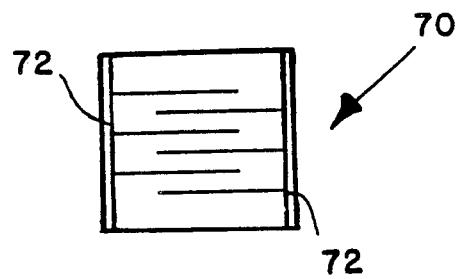
FIG. 13 is an illustration of a capacitor of the invention.
Figure 12:
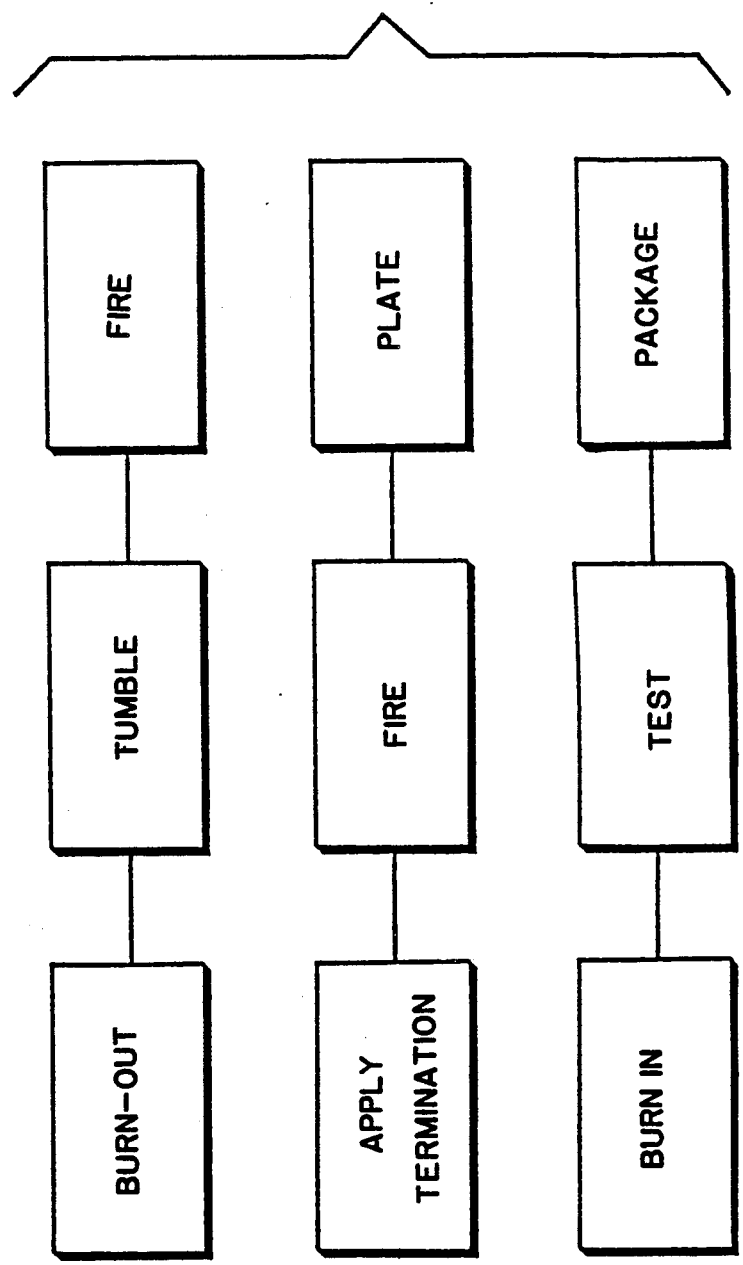
FIG. 12 is a process flow diagram of the steps for forming a finished capacitor.

Finished multilayered ceramic capacitors are then made by techniques well known in the art and these prior art steps are illustrated in FIG. 12. A finished capacitor 70 is shown in FIG. 13 and includes end terminations 72.

Figure 14A:
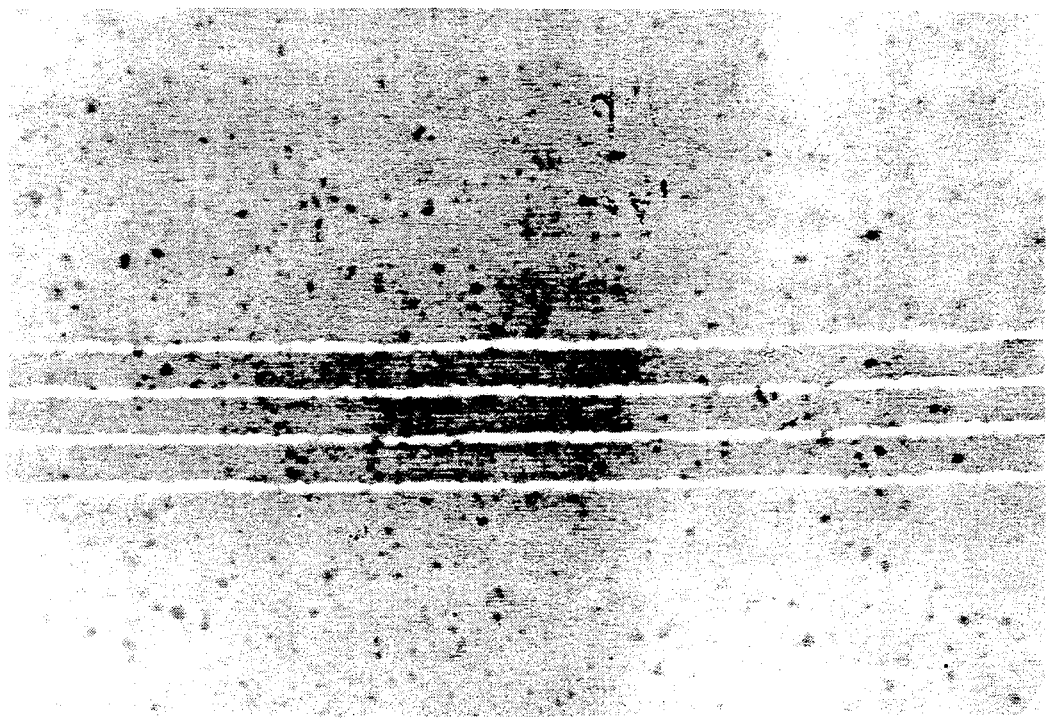
FIGS. 14a and 14b are photomicrographs of capacitors manufactured by the disclosed process.
Figure 14B:
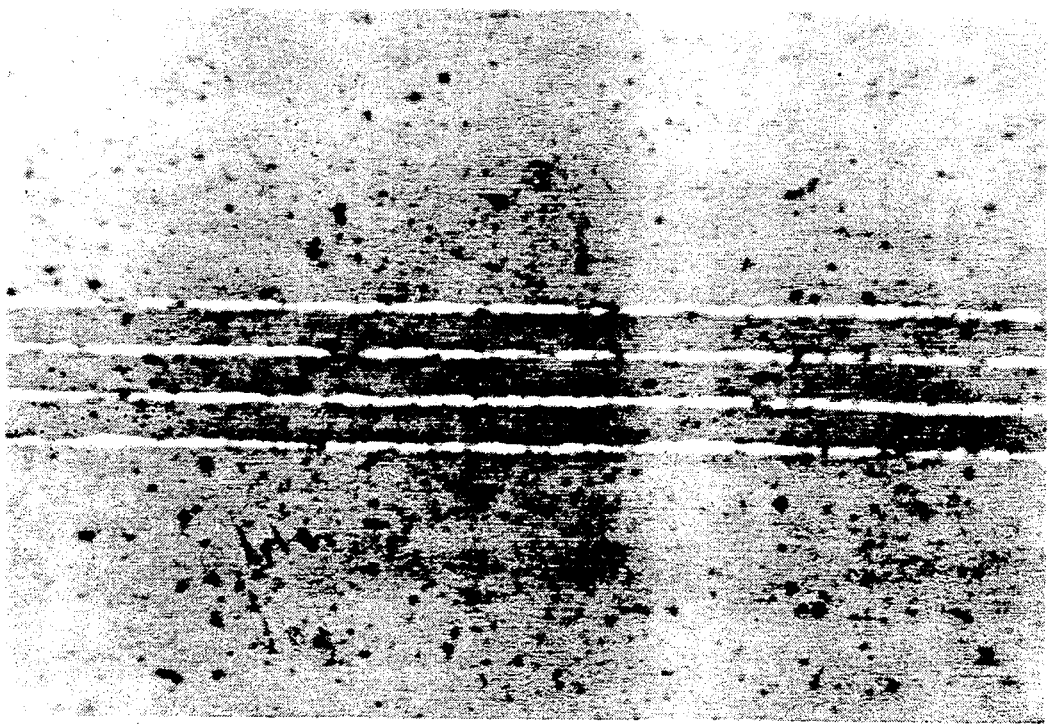

FIGS. 14a and 14b are photomicrographs of capacitors made according to the process of the invention. The stacked sheets were laminated at 3.9 tons/in$^2$ for 3 minutes at 65° C. The capacitors were then cut and polished. These capacitors were made with the silver/palladium electrode ink formulation and an X7R dielectric. The electrode layers for the capacitors of FIG. 14 were approximately 80 microinches and the dielectric layers, including the embedded electrodes, were approximately 350 microinches. (All photographs, FIGS. 14, 15 and 16, were done at 400 X. At 400 X, 1 mm=0.1 mil=0.0001 inches or 100 microinches).

Figure 15A:
FIGS. 15a, 15b and 15c are photomicrographs of comparable prior art capacitors.
Figure 15B:
Figure 15C:
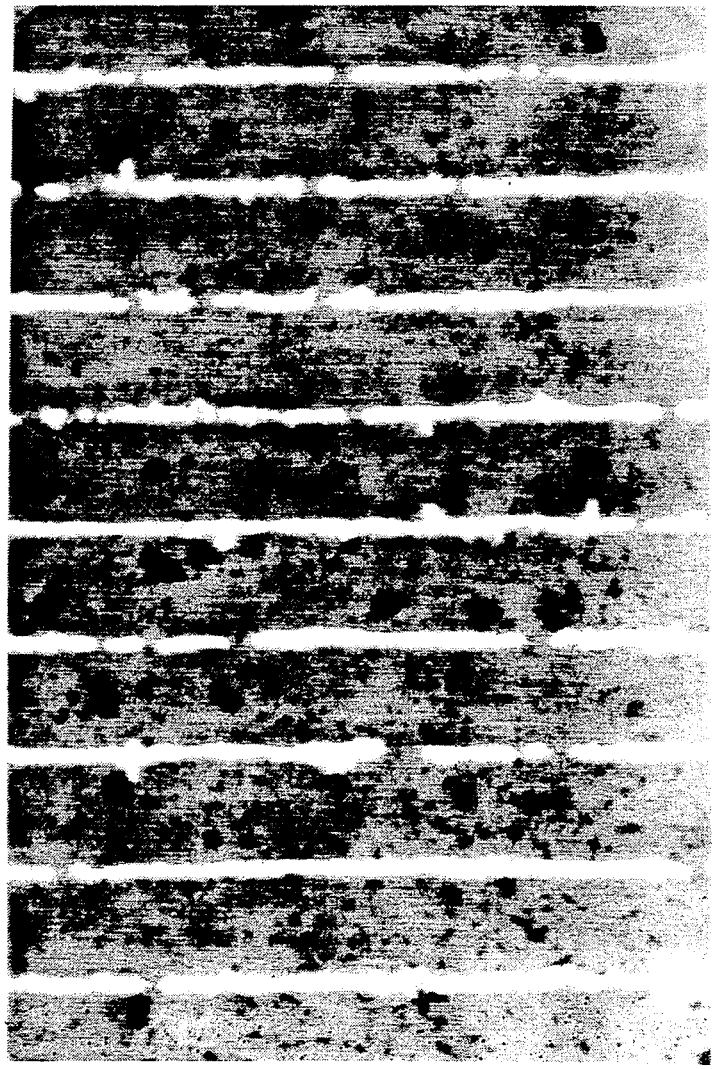

FIGS. 15a, 15b and 15c are photomicrographs taken of prior art capacitors cut and polished. The capacitors of FIG. 15a and 15b were made with a X7R dielectric. FIG. 15c is another prior art capacitor made with a 25U dielectric. Comparisons between the capacitors of the invention and those of the prior art clearly illustrate the advantages gained by the present invention. The dielectric and electrode layers of the prior art capacitors are approximately twice as thick as the layers of the inventive capacitors. In addition to the significant reduction in the size of the capacitors that is achieved by these thinner electrode and dielectric layers, the photographs also illustrate the enhanced uniformity and smoothness of the electrode layers in the dielectrics.

TEST RESULTS

Figure 11:
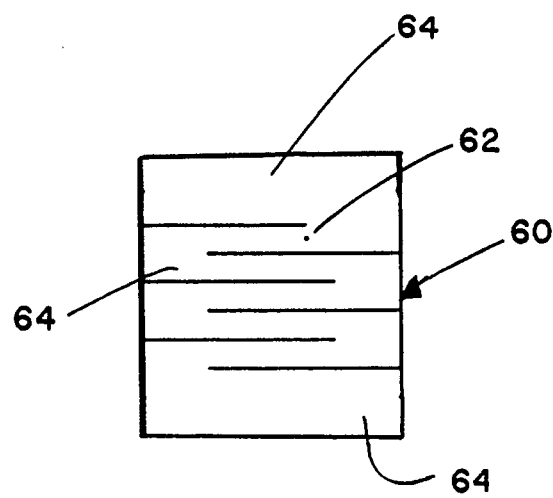
FIG. 11 is an illustration of a stack of electrode embedded dielectric layers.

Capacitors, 1206 size, manufactured by the disclosed process to have a BF value of 10,000 and an X7R characteristic were evaluated for their electrical characteristics per MIL-C-55681B. The capacitors tested exceeded the standard values set for the industry. Electrode embedded sheets were made, stacked and laminated at 3.9 tons/square inch at 65° C. for three minutes. Subsequently, the unfinished capacitors, FIG. 11, were cut from the solvent adhered laminated stack. Three groups of capacitors were evaluated; CEC-2, CEC-3, and CEC-4. The difference between these groups of capacitors was in the way they were terminated.

The CEC-2 group was densified and a silver termination added after firing. The CEC-3 group was terminated in the green state with a fritless Ag-Pd termination corresponding in composition to that of the internal electrode. The CEC-4 group was terminated like the CEC-3 group was, but in addition had a silver fired coating over the Ag-Pd co-fired termination.

Figure 16A:
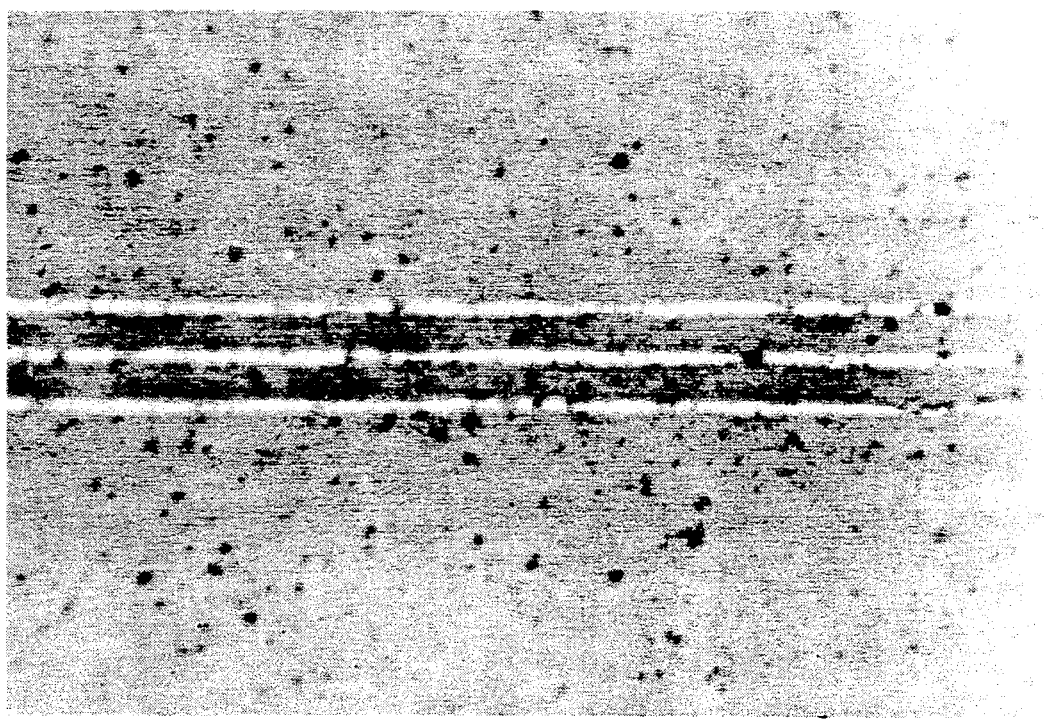
FIGS. 16a and 16b are photomicrographs of capacitors manufactured by the disclosed process which represent two types of capacitors that were tested.

Each group comprised two sets of samples. The samples from the first set, roll number 16-3D, had three electrode layers 75 microinches thick. The dielectric layers including the embedded electrodes were 350 microinches. FIG. 16a is a photomicrograph of a capacitor made from roll 16-3D.

Figure 16B:
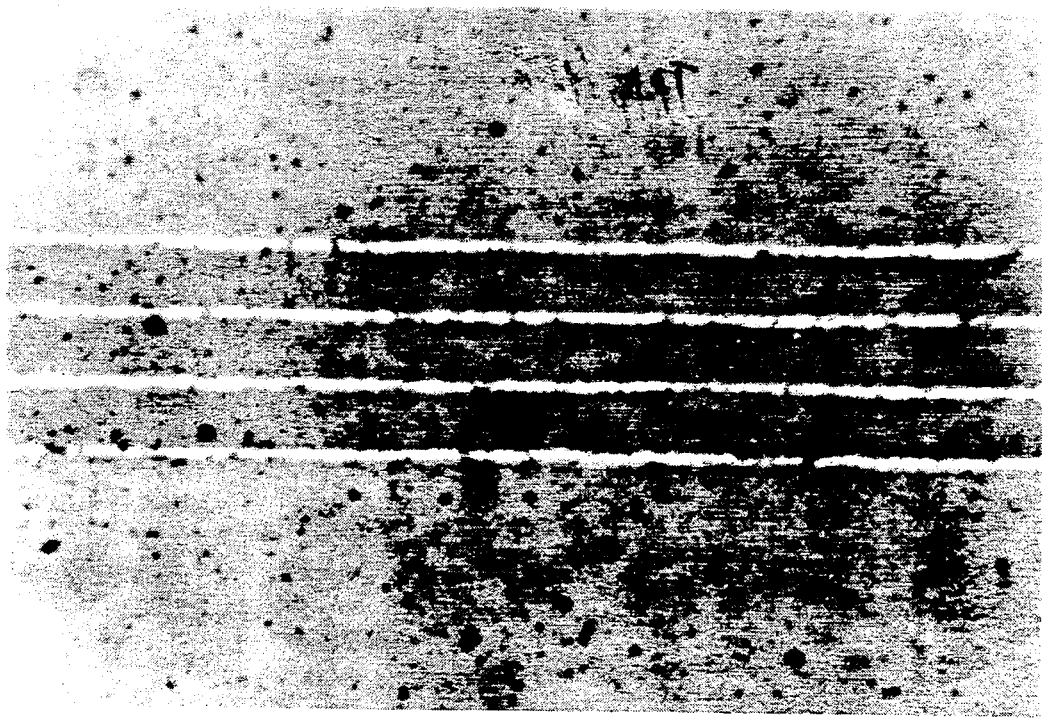

Samples from the second set, roll number 18-3B, had four electrode layers, 75 microinches thick. The dielectric layers including the embedded electrodes were 560 microinches thick. FIG. 16b is a photomicrograph of a capacitor made from roll 18-3D.

The organic burn-out cycle for all groups was as follows:

| | | |
|---|---|---|
| Step 1 | 25° C. | 480 minutes at 150° C., soak 60 minutes |
| Step 2 | 150° C. | 480 minutes at 250° C., soak 60 minutes |
| Step 3 | 250° C. | 480 minutes at 400° C., soak 60 minutes |
| Step 4 | 400° C. | 120 minutes at 1120° C., soak 60 minutes |

Dissipation Factor (DF)

The DF at 1 KHz and 25° C. was measured for CEC-2 and found to range between about 3 and 9% at 1 VAC. In addition the capacitance between 0.17 V and 1 VAC changed about 4%. This was indicative of a defective termination. Examination revealed that the electrode before termination had partially evaporated.

CEC-3 was terminated with a co-fired Ag-Pd fritless composition. Thus reduced the DF to a consistent 2.5 to 3%.

CEC-4 gave the lowest DF of 2.2 to 2.5%. The internal electrode thickness was about 75 microinches, about half of that of current commercial practice. The results indicate that thin electrodes can be processed to yield acceptable dissipation factors. Current thickness of competitive parts are about 150 microinches.

Capacitance

Capacitance readings were made in accordance with industry standards, i.e, one volt C applied at 1 KHz.

The average value of 20 CEC-4 capacitors was 10098 BF with a standard deviation of 3.33% for the 350 microinches dielectric thickness and 10216 BF with a standard deviation of 2.18% for the 560 microinches dielectric. All samples were within 5% and these small standard deviations indicate good process control and virtually 100% yield of 10% parts.

Insulation Resistance

The insulation resistance of CEC-3 samples measured at 50 V and at 25° C. and 125° C. had IR values well in excess of $10^{11}$ ohms at room temperature and in excess of 250 megohm microfarads at 125° C., both 350 microinches dielectric units and 560 microinches. Results of IR measurements at 125° C. were in excess of MIL-C-55681B specifications.

| Two Minute IR Readings in Thousands of Megohms | | | |
|---|---|---|---|
| 350 Microinch Dielectric | | 560 Microinch Dielectric | |
| 25° C. | 125° C. | 25° C. | 125° C. |
| 3000 | 50 | 1700 | 55 |
| 3500 | 55 | 1700 | 80 |
| 3000 | 30 | 3000 | 55 |
| 2500 | 100 | 2000 | 80 |
| 4000 | 65 | 1700 | 95 |
| 3000 | 65 | 2000 | 60 |
| 3000 | 110 | 1700 | 90 |
| 4000 | 20 | 270 | 60 |
| 3500 | 110 | 2000 | 60 |
| 3000 | 100 | | |

CAPACITANCE VARIATION
CEC-4
350 Microinch Dielectric, 75 Microinch Electrode

| Capacitance (pf) | DF (%) | DWV* | IR (2 min., 50 V) |
|---|---|---|---|
| 10,205 | 2.44 | Pass | 750K megohms |
| 10,376 | 2.41 | | 900K megohms |
| 9,894 | 2.49 | | 650K megohms |
| 9,790 | 2.40 | | 1000K megohms |
| 9,806 | 2.45 | | 1200K megohms |
| 10,450 | 2.46 | | 950K megohms |
| 9,710 | 2.45 | | 900K megohms |
| 10,282 | 2.45 | | 1000K megohms |
| 10,455 | 2.44 | | 1000K megohms |
| 9,634 | 2.48 | | 850K megohms |
| 9,714 | 2.47 | | 1000K megohms |
| 10,244 | 2.47 | | 1300K megohms |
| 10,419 | 2.46 | | 1400K megohms |
| 10,472 | 2.46 | | 2000K megohms |
| 10,294 | 2.61 | | 2000K megohms |
| 9,854 | 2.45 | | 2000K megohms |
| 9,859 | 2.44 | | 5000K megohms |
| 9,480 | 2.41 | | 2000K megohms |
| 10,669 | 2.48 | | 1000K megohms |
| 10,312 | 2.47 | | 1100K megohms |
| Average | | 10098 pF | |
| Standard Deviation | | 336 | |
| SD/A (%) | | 3.33 | |

*Dielectric withstanding voltage

CAPACITANCE VARIATION
CEC-4
560 Microinch Dielectric, 75 Microinch Electrode

| Capacitance (pf) | DF (%) | DWV | IR (2 min., 50 V) |
|---|---|---|---|
| 10,349 | 2.15 | Pass | 1200K megohms |
| 10,658 | 2.18 | | 1400K megohms |
| 10,212 | 2.20 | | 1400K megohms |
| 10,338 | 2.15 | | 1000K megohms |
| 10,306 | 2.16 | | 1000K megohms |
| 10,054 | 2.10 | | 1200K megohms |
| 9,874 | 2.14 | | 1800K megohms |
| 10,006 | 2.14 | | 750K megohms |
| 10,324 | 2.13 | | 1600K megohms |
| 10,300 | 2.20 | | 700K megohms |
| 10,417 | 2.18 | | 1000K megohms |
| 10,023 | 2.14 | | 1800K megohms |
| 9,967 | 2.14 | | 750K megohms |
| 10,128 | 2.16 | | 800K megohms |
| 10,090 | 2.20 | | 2000K megohms |
| 10,231 | 2.18 | | 850K megohms |
| 10,333 | 2.21 | | 700K megohms |
| 10,721 | 2.20 | | 2000K megohms |
| 9,904 | 2.17 | | 1000K megohms |
| 10,079 | 2.18 | | 1400K megohms |
| Average | | 10216 pF | |
| Standard Deviation | | 223 | |
| SD/A (%) | | 2.18 | |

Voltage Breakdown

The voltage breakdown studies of samples supplied show that the capacitors produced by the process have superior dielectric strength. For example, prior art 50 volt, 0.1 microfarad, 1206 capacitors broke down between 800–890 volts. These capacitors had a dielectric thickness of 950 microinches. Their voltage stress at breakdown was about 1000 V/mil. In comparison the samples with a dielectric thickness of 350 microinches had an average breakdown of about 2000 volts/mil (the worst case was 1700 volts/mil and the best case about 2500 volts/mil). The voltage breakdown of 560 microinch dielectric was 1400-1500 volts/mil and the actual breakdown voltage was greater than the prior art parts.

It should be noted that firing conditions and the ceramic formulations were not optimized. The capacitors of the invention clearly should exhibit superior reliability.

Voltage Breakdowns

Voltage breakdowns of CEC-3 samples were carried out by increasing the voltage in 10 volt increments starting at 500 volts for 350 microinches and 700 volts for 560 microinches samples. The data shows exceptional dielectric strength for both thickness. This improved dielectric strength is attributed to the processing, which yields a dense, virtually void free ceramic, and a very uniform electrode.

| Breakdown Voltage (75 microinch electrode) | |
|---|---|
| 350 microinch dielectric | 560 microinch dielectric |
| 650 | 750 |
| 710 | 880 |
| 650 | 850 |
| 600 | 740 |
| 590 | 830 |
| 700 | 970 |
| 700 | 810 |
| 690 | 800 |
| 780 | 700 |
| 900 | 800 |

TEMPERATURE COEFFICIENT OF CAPACITANCE (TCC)

The TCC of both sets of CEC-3 were measured over the range of −55° C. to +125° C. with both 25 and 50 VDC applied at 1 KHZ. Results indicate that, surprisingly, both parts can be rated as BX (+15, −25%). All parts, CEC-2, CEC-3, and CEC-4 can be rated X7R dielectrics. The data below from five units was averaged in the table below. An unusual aspect of the improved dielectrics of this invention appears to be a flattening of the TCC curve with voltage. This is most pronounced with the 0.35 mil dielectric at 50 VDC. It should be noted that the capacitance depressions with voltage depends on the dielectric formulation and processing. The above data is not optimized for sintering conditions.

| 350 Microinch Dielectric | | | |
|---|---|---|---|
| | 0V | 25 VDC | 50 VDC |
| −55 | −4.7 | −20.5 | −39.1 |
| −30 | −1.8 | −18.3 | −37.7 |
| +10 | +1.8 | −18.2 | −38.4 |
| +25 (reference) | | −18.4 | −38.3 |
| +45 | −0.9 | −19.3 | −39.0 |
| +65 | −2.7 | −19.8 | −39.7 |
| +85 | −4.3 | −20.8 | −40.7 |
| +125 | −10.9 | −24.8 | −41.6 |

| 560 Microinch Dielectric | | | |
|---|---|---|---|
| | 0V | 25 VDC | 50 VDC |
| −55 | −4.0 | −15.1 | −29.8 |
| −30 | −1.2 | −11.6 | −27.9 |
| +10 | +1.2 | −11.5 | −28.8 |
| +25 (reference) | | −11.6 | −28.6 |
| +45 | −1.3 | −13.2 | −29.8 |
| +65 | −3.2 | −13.8 | −30.5 |
| +85 | −4.5 | −14.9 | −31.8 |
| +125 | −10.9 | −20.2 | −34.0 |

| DC CAPACITANCE VOLTAGE DEPRESSION AT 25° C. (%) | | |
|---|---|---|
| DC VOLTS | 350 microinch | 560 microinch |
| 0 | — | — |
| 10 | −2.6 | −0.1 |
| 20 | −11.9 | −6.6 |
| 30 | −21.6 | −14.4 |
| 40 | −30.0 | −21.3 |
| 50 | −37.0 | −27.5 |
| 60 | −43.2 | −33.0 |
| 70 | −48.4 | −38.0 |
| 80 | −53.4 | −42.3 |
| 90 | −57.2 | −46.3 |
| 100 | −60.7 | −49.8 |

CEC-3, 5 piece average

Life Testing

The following table summarizes the results of 1000 hour life testing at 125° C. of capacitors having 350 microinch thickness and 560 microinch thickness X7R dielectric produced by the disclosed process. The units were initially terminated with co-fired palladium and overcoated with a standard silver termination (CE 662). All parts passed a DWV test corresponding to an assumed rated voltage and is less than 10 megohms. The results are outstanding in view of the high test stresses involved in terms of the ability to withstand IR degradation, the small change in capacitance*, and essentially unchanged or improved dissipation factor. An IR failure is defined as the value a unit has when tested at rated voltage and is less than 10 megohms.

| 1000 HOUR TEST RESULTS | | | | | |
|---|---|---|---|---|---|
| Initial Lot Size | Dielectric Thickness Microinches | Assumed Voltage Rating | Test Voltage | C | Comments |
| 30 | 350 | 16 | 32 | None | No Failures |
| 30 | 560 | 25 | 50 | None | No Failures |
| 30 | 350 | 25 | 50 | None | 2 units failed actual IR, DPA showed 1 unit had internal crack, other unit not analyzed 1 unit erratic at 800 hours |
| 30 | 350 | 50 | 100 | None | 1 unit had 10 mΩ value at end of test. No failure at 800 hours |
| 20** | 350 | 25 | 50 | 5-10% | 1 unit failed at 250 hours - no additional failures at end |

-continued

1000 HOUR TEST RESULTS

| Initial Lot Size | Dielectric Thickness Microinches | Assumed Voltage Rating | Test Voltage | C | Comments |
|---|---|---|---|---|---|
| 30 | 560 | 50 | 100 | 5–10% | at 1000 hours No Failures |
| 20** | 560 | 50 | 100 | 5–10% | No Failures |

*MIL-C-39014 allows ±20% C Change
**Different silver termination supplied with parts over Pd. The electrical stress on the first two lots were comparable to that impressed on current commercial units.

The foregoing description has been limited to a preferred embodiment of the invention. It will be apparent, however, that variations and modifications can be made to the invention, with the attainment of some or all of the advantages of the invention. Therefore, it is the object of the appended claims to cover all such variations and modification as come within the true spirit and scope of the invention.

Having described our invention, what we now claim is:

1. A method for forming an electrode embedded sheet for use in a multilayered electrical component which comprises:
    printing an electrode pattern on a support surface of a release film;
    calendering the electrode pattern so printed to smooth and densify the electrodes; and
    coating a dielectric layer over the electrode pattern to form the electrode embedded sheet on the release film.

2. The method of claim 1 which includes:
    flowing the dielectric between the electrodes of the electrode pattern such that the surfaces of both the electrodes and the dielectric on the release film are substantially co-planar.

3. The method of claim 2 which includes:
    calendering the dielectric layer to densify and smooth the dielectric layer.

4. The method of claim 3 which includes:
    coating a second dielectric layer over the first dielectric layer; and
    calendering the second layer.

5. The method of claims 2 or 4 wherein the release film is web-like and which includes:
    forming a plurality of sheets on the release film in linear relationship.

6. The method of claim 5 which includes:
    stacking said sheets in overlying registration such that a first pattern of electrodes on a first sheet is offset from a second pattern of electrodes on a second sheet in dielectric-electrode-dielectric-electrode relationship.

7. The method of claim 6 which includes:
    a) removing the release film from a first sheet;
    b) stacking subsequently a second sheet on the first sheet;
    c) removing the release film from the second sheet; and
    d) repeating steps a) through c) until a desired number of sheets have been stacked.

8. The method of claim 7 which includes:
    laminating the sheets;
    cutting the sheets to form unfinished capacitors;
    sintering the capacitors;
    forming end terminations on said capacitors; and
    providing a surface on said capacitor for an electrical connection(s) to form a finished capacitor.

9. A method for forming an electrode embedded sheet for use in a multilayered electrical component which includes:
    printing an electrode pattern on a support surface;
    coating a dielectric layer over the electrode pattern; and
    calendering the dielectric to densify and smooth the dielectric layer to form the electrode embedded sheet.

10. The method of claim 9 which includes:
    flowing the dielectric between the electrodes such that the support surfaces of both the electrode and the dielectric on the release film are substantially co-planar.

11. The method of claim 9 which includes:
    coating a second dielectric layer over the first dielectric layer; and
    calendering the second layer.

12. The method of claims 9 or 11 wherein the release film is web-like and which includes:
    forming a plurality of sheets on the release film in linear relationship.

13. The method of claim 12 which includes:
    stacking the electrode embedded sheets in overlying registration such that a first pattern of electrodes on a first sheet is offset from a second pattern of electrodes on a second sheet in dielectric-electrode-dielectric-electrode relationship.

14. The method of claim 13 which includes:
    a) removing the release film from a first sheet;
    b) stacking subsequently a second sheet on the first sheet;
    c) removing the release film from the second sheet; and
    d) repeating steps a) through c) until a desired number of sheets have been stacked.

15. The method of claim 14 which includes:
    laminating the sheets;
    cutting the sheets to form individual components;
    sintering the components;
    forming end terminations on said components; and
    providing a surface on said component for an electrical connection(s).

16. The method of claims 1, 3, 4, 9 or 11 which includes:
    printing the electrode pattern with a rotary screen printer.

17. The method of claims 1, 3, 4, 9 or 11 which includes:
    printing the electrode pattern with a gravure roll.

18. The method of claim 17 which includes printing the electrode pattern such that the electrodes have holes therein.

19. The method of claim 17 which includes coating the dielectric between the electrodes of the electrode pattern.

20. The method of claims 1, 3, 4, 9 or 11 which includes:
    coating the dielectric layer with a knife over roll coating applicator.

21. The method of claims 1, 3, 4, 9 or 11 wherein the electrode thickness ranges between about 50 to 400 microinches.

22. The method of claims 1, 3, 4, 9 or 11 where the minimum electrode thickness does not vary more than 10% from the average electrode thickness.

23. The method of claims 1, 3, 4, 9 or 11 wherein the minimum dielectric thickness does not vary more than 15% from the average dielectric thickness.

24. An electrode embedded sheet for use in the manufacture of multilayered electrical component which comprises:
a printed densified electrode pattern embedded in a densified dielectric layer, the surfaces of the electrodes of the pattern co-planar with the surface of the dielectric and wherein the minimum thickness of the electrodes does not vary more than 10% from the average thickness of the electrodes.

25. The sheet of claim 24 wherein the minimum thickness of the dielectric layer does not vary more than 15% from the average thickness of the dielectric layer.

26. The sheet of claim 25 wherein the minimum electrode thickness does not vary by more than 5% from the average thickness of the electrode and the minimum thickness of the dielectric layer does not vary more than 5% from the average thickness of the dielectric layer.

27. The sheet of claim 25 wherein the thickness of the electrodes is between about 50 to 400 microinches.

28. The green sheet of claim 27 wherein the thickness of the electrodes is between 50 to 90 microinches.

29. The sheet of claim 25 wherein the thickness of the dielectric layer is between 100 to 1500 microinches.

30. The sheet of claim 29 wherein the thickness of the dielectric layer is between 100 to 600 microinches.

31. A multilayered ceramic capacitor which comprises:
a plurality of densified dielectric layers having densified electrode patterns embedded therein, the electrodes of the layers arrayed in alternating offset relationship, the surfaces of the electrodes of the pattern in a layer being co-planar with the surface of said dielectric layer and wherein the minimum thickness of the electrode does not vary more than 10% from the average electrode thickness; and
end terminations formed on said capacitor.

32. The capacitor of claim 31 wherein the minimum thickness of the dielectric layer does not vary more than 15% from the average thickness of the dielectric layer.

33. The capacitor of claim 32 wherein the electrode thickness is between 50 to 400 microinches.

34. The sheet of claim 33 wherein the thickness of the electrode is between 50 to 90 microinches.

35. The capacitor of claim 32 wherein the thickness of the dielectric layer is between 300 to 1500 microinches.

36. The sheet of claim 35 wherein the thickness of the dielectric layer is between 300 to 600 microinches.

37. A method for forming an electrode embedded sheet for use in a multilayered electrical component which comprises:
printing an electrode pattern on a support surface of a release film;
calendering the electrode pattern so printed to smooth and densify the electrodes;
coating a first dielectric layer over the electrode pattern to form the electrode embedded green sheet on the release film;
calendering the dielectric layer to density and smooth the dielectric layer;
coating a second dielectric layer over the first dielectric layer; and calendering said second layer.

38. The method of claim 37 which comprises:
stacking said sheets in overlying registration such that a first pattern of electrodes in a first sheet is offset from a second pattern of electrodes on a second sheet in a dielectric-electrode-dielectric-electrode relationship by;
a) removing the release film from a first sheet;
b) stacking subsequently a second sheet on the first sheet;
c) removing the release film from the second sheet; and
repeating steps a) through c) until a desired number of sheets have been stacked.

39. The method of claim 38 which comprises:
laminating the sheets;
cutting the sheets to from unfinished capacitors;
sintering the capacitors;
forming end terminations on said capacitors; and
providing a surface on said capacitor for an electroconnection to form a finished capacitor;

40. The method of claim 38 which includes:
printing the electrode pattern with a rotary screen printer.

41. The method of claim 38 which includes:
printing the electrode pattern with a gravure roll applicator.

42. The method of claim 38 which includes: coating the dielectric with a knife over roll.

* * * * *

UNITED STATES PATENT AND TRADEMARK OFFICE
CERTIFICATE OF CORRECTION

PATENT NO. : 5,101,319

DATED : 31 March 1992

INVENTOR(S) : Robert J. Deffeyes; Jewel G. Rainwater; William R. Belko; Arne B. Carlson It is certified that error appears in the above—identified patent and that said Letters Patent is hereby corrected as shown below:

ON THE TITLE PAGE

Item [19], "Diffeyes" should be --Deffeyes--.

Item [75], Robert J. Diffeyes should be --Robert J. Deffeyes--.

Signed and Sealed this

Eighth Day of June, 1993

Attest:

MICHAEL K. KIRK

Attesting Officer

Acting Commissioner of Patents and Trademarks